(12) United States Patent
Schislyonok (10) Patent No.: US 6,564,501 B1
(45) Date of Patent: May 20, 2003

(54) SMALL ANIMAL TRAP WITH LOCKING GATE

(76) Inventor: Leonid Leonidovich Schislyonok, 9 Gamarnika Street, Corp 1 Apt 24, Minsk, Belorus 230090 (BY)

( * ) Notice: Subject to any disclaimer, the term of this patent is extended or adjusted under 35 U.S.C. 154(b) by 0 days.

(21) Appl. No.: 10/190,743

(22) Filed: Jul. 9, 2002

(51) Int. Cl.⁷ .............................................. A01M 23/02
(52) U.S. Cl. ....................................................... 43/61
(58) Field of Search ....................................... 43/61, 60

(56) References Cited

U.S. PATENT DOCUMENTS

| 1,240,248 | A | | 9/1917 | Pease et al. | |
|---|---|---|---|---|---|
| 1,273,185 | A | * | 7/1918 | Reich | 43/60 |
| 1,294,293 | A | * | 2/1919 | Margo | 43/61 |
| 1,581,297 | A | * | 4/1926 | Schmuck | 43/60 |
| 1,996,872 | A | * | 4/1935 | Long | 43/61 |
| 2,342,444 | A | * | 2/1944 | Alday | 43/61 |
| 2,475,462 | A | * | 7/1949 | Rosen | 43/61 |
| 2,485,319 | A | | 10/1949 | Rosen | 43/61 |
| 2,573,228 | A | * | 10/1951 | Slauth | 43/61 |
| 2,774,175 | A | * | 12/1956 | Maddocks | 43/61 |
| 2,885,820 | A | * | 5/1959 | Maggio | 43/61 |
| 3,177,608 | A | * | 4/1965 | Lindelow | 43/61 |
| 3,975,857 | A | * | 8/1976 | Branson et al. | 43/61 |
| 4,232,472 | A | * | 11/1980 | Muelling | 43/61 |
| 4,550,523 | A | | 11/1985 | Spiller | 43/61 |
| 4,578,892 | A | | 4/1986 | Melton | 43/60 |
| 4,744,170 | A | | 5/1988 | Chow | 43/61 |
| 4,768,305 | A | | 9/1988 | Sackett | 43/61 |
| 4,819,368 | A | * | 4/1989 | Fodor | 43/61 |
| 5,148,625 | A | * | 9/1992 | Saleman | 43/121 |
| 5,502,918 | A | | 4/1996 | Oviatt | 43/61 |
| 5,720,125 | A | | 2/1998 | Oviatt | 43/61 |
| 5,943,813 | A | * | 8/1999 | Wang | 43/61 |

* cited by examiner

Primary Examiner—Charles T. Jordan
Assistant Examiner—Jordan M Lofdahl
(74) Attorney, Agent, or Firm—Sandra M. Kotin (57) ABSTRACT

A small animal trap that captures the animal alive and does not cause injury to the animal. The chamber of the trap is in two segments, the floors of which form an obtuse angle permitting the trap to rotate rearward when activated by the movement of the animal inside. The trap has a pivotal front door panel that is held horizontally open and supported on two legs to provide maximum access to the front opening. When set, the front segment is even with the supporting surface and when activated the front segment is raised causing the front door panel to pivot closed and become locked in place when two locking feet located on the bottom of each leg engage a locking channel on the underside of the chamber. The pivotal door panel is weighted to insure quick and secure closure. A removable back panel with a bait receiving element permits easy placement of bait at the very back of the chamber so that the animal will travel to the back end of the chamber and activate the trap. Stabilizers prevent the trap from falling over sideways.

16 Claims, 9 Drawing Sheets

SMALL ANIMAL TRAP WITH LOCKING GATE

FIELD OF THE INVENTION

The instant invention relates to animal traps, more specifically to traps used to catch small animals alive and without injury to the animal.

BACKGROUND OF THE INVENTION

Small animals, especially small rodents, have posed a scourge to mankind since the beginnings of civilization. It has been the challenge of many an inventor to build the "better mousetrap". The traditional mousetrap utilizes a spring mechanism with a sensitive trigger which kills the animal, often in a messy and unsanitary manner. There have been a number of mousetraps that have attempted to trap the mouse or other such small animal without the injuries and unsanitary results incident to the more familiar types of traps.

An early example of such an animal trap is taught by Pease et al. in U.S. Pat. No. 1,240,248. An elongated container, square in cross section and tapering from an open front end to a closed back end, has a fulcrum on its undersurface near the front end. A sliding gate with an opening at the bottom and two uneven legs is raised and balanced in the open position and the container is tipped toward the front end. When the animal enters and moves to the back end the container shifts and tilts toward the back end and the gate descends trapping the animal inside. The inventor suggested that this trap be made of glass, the only moldable material available at that time. This trap appears to present difficulties with the balancing of the container while maintaining the gate in the open position.

In U.S. Pat. No. 2,485,319, Rosen teaches an oblong container, square in cross section, open at the front end and closed at the back end, and with a fulcrum in the form of a rod affixed to the underside of the container at a point near the front end. One segment of an L-shaped rod is pivotally affixed across the bottom of the open front end and cooperates with a gate that rests on the ground. The other segment of the rod is held parallel to the side wall and is weighted at the top. When an animal enters the container and moves to the back end toward the bait, the container tilts rearward causing the weight to fall rearward and the gate to rise, closing the front end. The gate is not locked in any manner and the force of the animal charging toward the front end could tilt the container forward and cause the gate to be opened.

Spiller (U.S. Pat. No. 4,550,523) discloses a similar trap which has the fulcrum closer to the midpoint of the container. When the animal causes the container to tilt rearward, a rotatable gate swings downward and is supported on the floor preventing the door from being opened by the animal's movements. If the supporting floor or ground is not flat the door cannot be properly supported and may not completely close the entryway. This trap is made up of only two pieces. The similar device of Sackett (U.S. Pat. No. 4,768,305) is round in cross section, has a removable back wall, and is closed by the dropping of a ball or spool that is balanced above the entrance or by a gate that is balanced within side slots.

Oviatt, in U.S. Pat. No. 5,502,918, describes a Y-shaped tube balanced on a frame acting as a pivot. The animal enters into a downward facing branch of the Y and moves into the straight portion which pivots downward causing a ping pong ball balanced in the other branch of the Y to fall into the tube trapping the animal. The frame must be place on a flat horizontal surface for the trap to function properly. Oviatt also teaches a tubular chamber with a fulcrum and an entrance on one side near the front end. When the chamber tilts rearward under the weight of the animal a ping pong ball is released into the chamber to trap the animal. (U.S. Pat. No. 5,720,125) These traps are constructed of a number of individual pieces which make manufacture expensive and impractical.

A rodent trap in the form of an elongated container with two contiguous bottom surfaces forming an obtuse angle is disclosed by Melton in U.S. Pat. No. 4,578,892. This device is open at the front end and closed at the back end. There is a front gate attached by a hinge formed as a stressed line or depression in the material of the unitary structure. The gate has a short closing tab situated in the center of the bottom edge of the gate and formed at a right angle to the gate. A raised point in the end of the tab is the locking element. There is a small depression in the underside of the container to accept the raised point and hold the door closed. When the trap is set the container rests on the first bottom surface and the gate is held open by the tab. The only access to the interior of the trap is around the sides of the partially opened gate. The weight of the animal as it moves to the back of the container causes the container to tilt backward and rest on the second bottom surface and the gate to swing closed. Melton adds a magnet situated at the front edge of the container and a magnetized door since the locking mechanism is not secure. The device of Chow (U.S. Pat. No. 4,744,170) has a curved bottom and operates in the same manner. Chow uses a gate that must be balanced against the top of two side slots and which is caused to fall into the slots when the chamber rocks rearward. This device must be balanced carefully to hold the gate open.

The prior art traps either rely on gates that must be carefully balanced to remain open, or gates that do not provide a full opening and easy access to the interior of the chamber. Any irregularities in the supporting surface could prevent the balance that is necessary for proper operation.

There is a need for a small animal trap that can completely contain the animal and does not injure the animal in an unsanitary manner while providing wide access to the interior and a secure and sensitive locking gate to insure closure and prevent the animal's escape.

BRIEF SUMMARY OF THE INVENTION

The instant invention provides a trap for small animals, specifically rodents, that will cause the animal to enter the trap easily and will close quickly and securely.

It is an object of the instant invention to provide an animal trap that has a wide open entry for easy access to the interior.

Another object of the instant invention is to provide a weighted and balanced door that closes quickly and solidly when the trap is activated.

It is a further object of the instant invention to have the weighting of the door part of the construction and design.

It is another object of the instant invention to have a door locking mechanism that is sure and secure.

It is a further object of the instant invention to have a removable rear panel for easy placement of bait.

It is a still further object of the instant invention to provide the rear panel with a bait receiving element that is situated off center so as to enable the bait to be set at more than one position or level.

Another object of the instant invention is to provide stabilizers so that the chamber cannot be toppled over if the trapped animal moves about violently.

It is another object of the present invention to provide an animal trap that does not require many parts so as to be easy and inexpensive to manufacture.

The instant invention is a small animal trap that is capable of capturing the animal alive and without injury. The trap has a tubular chamber with a front opening and a rear opening and is composed of two contiguous segments, a first forward segment and a second rearward segment, each of the segments being defined by an upper surface, a lower surface, and two side walls, and the segments being joined such that the lower surfaces of the two segments form an obtuse angle. There are two pivot pins, each situated on an upper exterior surface of one of the side walls adjacent to the front opening and a rear closure panel having an interior surface and an exterior surface and being dimensioned to reversibly and securely close the rear opening. A bait receiving element integral with the interior surface of the rear closure panel is situated at point off center on the interior surface so as to permit different positioning of bait. There is a transverse locking channel situated on the exterior lower surface of the first segment. A front door assembly comprising a front closure panel having an upper edge and a lower edge and being dimensioned to securely close the front opening, two ears situated on opposing upper corners of the front closure panel, integral therewith, and projecting rearward at right angles therefrom, each of the ears having an aperture dimensioned to pivotally receive the pivot pins and enabling the front closure panel to be pivoted upward to a horizontal orientation when the trap is set and downward and to close the front opening when the trap is activated, two support legs integral with said front closure panel and projecting downward at right angles from opposing corners of the lower edge thereof such that the support legs maintain the front closure panel in the open horizontal orientation while providing substantially unobstructed accessibility to the front opening when the trap is set. A locking member is situated at the bottom of each support leg and projecting rearward at right angles therefrom for cooperation with the locking channel when the trap is activated. When the trap is set the forward segment is in a substantially horizontal orientation, the front closure panel is open, and bait is placed on the bait receiving element to entice an animal to enter the trap through the front opening and move rearward activating the trap, at which time the chamber tilts rearward, the front closure panel pivots downward to close the front opening and the locking members engage the locking channel securely entrapping the animal.

The instant invention encompasses an improved small animal trap of a type having a tubular chamber with two integral floor segments, a forward segment and a rearward segment forming an obtuse angle, and an open front end, where the improvements comprise an open back end with a removable closure panel having an interior surface and an exterior surface and being dimensioned to reversibly and securely close the open back end and enable easy placement of bait inside the chamber. A bait receiving element is integral with the interior surface of the back closure panel and situated at a point off center on said interior surface so as to permit different positioning of bait. Two pivot pins are each situated on an upper exterior surface of each side of the forward segment of the chamber adjacent the open front end. There is a transverse locking channel situated on the exterior undersurface of the forward segment and a front door assembly which comprises a front closure panel having an upper edge and a lower edge and being dimensioned to securely close the front closure panel having an upper edge and a lower edge and being dimensioned to securely close the front opening, two ears situated on opposing upper corners of the front closure panel, integral therewith, and projecting rearward at right angles therefrom, each of the ears having an aperture dimensioned to pivotally receive the pivot pins and enable the front closure panel to be pivoted upward to a horizontal orientation when the trap is set and downward to close the front opening when the trap is activated. Two support legs are integral with the front closure panel and project downward at right angles from opposing corners of the lower edge thereof such that the support legs maintain the front closure panel in the open horizontal orientation while providing substantially unobstructed accessibility to the front opening when the trap is set. There is a locking member situated at the bottom of each support leg and projecting rearward at right angles therefrom for cooperation with the locking channel when the trap is activated.

The instant invention also encompasses a pivotal door assembly for use with a small animal trap of a type having a chamber with two floor segments, a forward segment and a rearward segment forming an obtuse angle, an open front end, a closed back end, a locking channel on the underside of the forward end, and two pivot pins, each situated on an upper exterior surface of the chamber adjacent the open front end. The door assembly comprises a front closure panel having an upper edge and a lower edge and being dimensioned to securely close the front opening, two ears situated on opposing upper corners of said front closure panel, integral therewith, and projecting rearward at right angles therefrom, each of said ears having an aperture dimensioned to pivotally receive the pivot pins and to enable the front closure panel to be pivoted upward to a horizontal orientation when the trap is set and to swing downward to a closed orientation when the trap is activated, two support legs integral with the front closure panel and projecting downward at right angles from opposing corners of the lower edge thereof such that said support legs maintain the front closure panel in the open horizontal orientation while providing substantially unobstructed accessibility to the front opening when the trap is set, and a locking member situated at the bottom of each support leg and projecting rearward at right angles therefrom for cooperation with the locking channel when the trap is activated.

Other features and advantages of the invention will be seen from the following description and drawings.

DETAILED DESCRIPTION OF THE INVENTION

Figure 1:
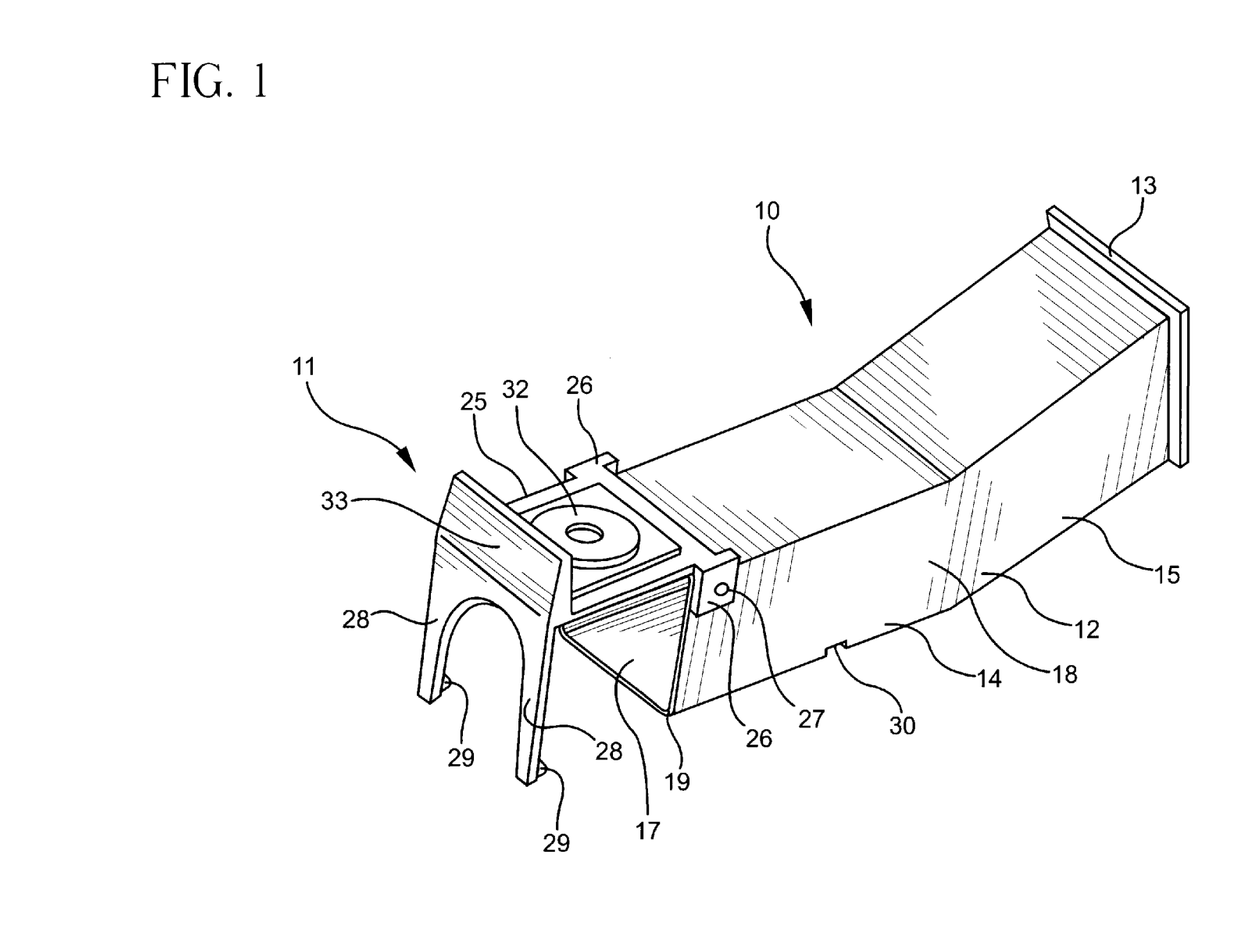
FIG. 1 is a front perspective view of the trap of the instant invention ready to accept an animal.
Figure 2:
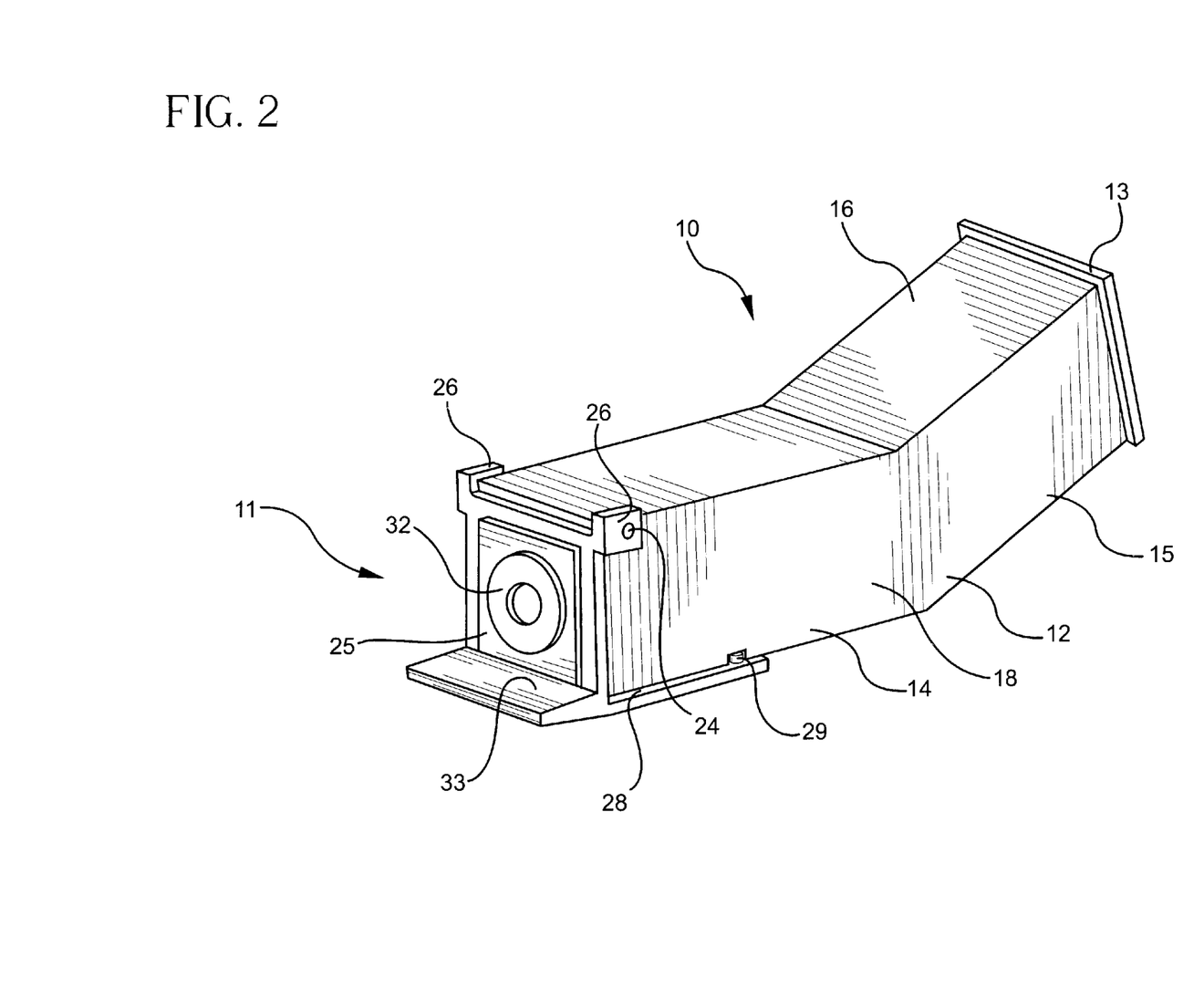
FIG. 2 is a front perspective view of the trap of the instant invention with the front door closed and locked after an animal has entered and tripped the door.
Figure 3:
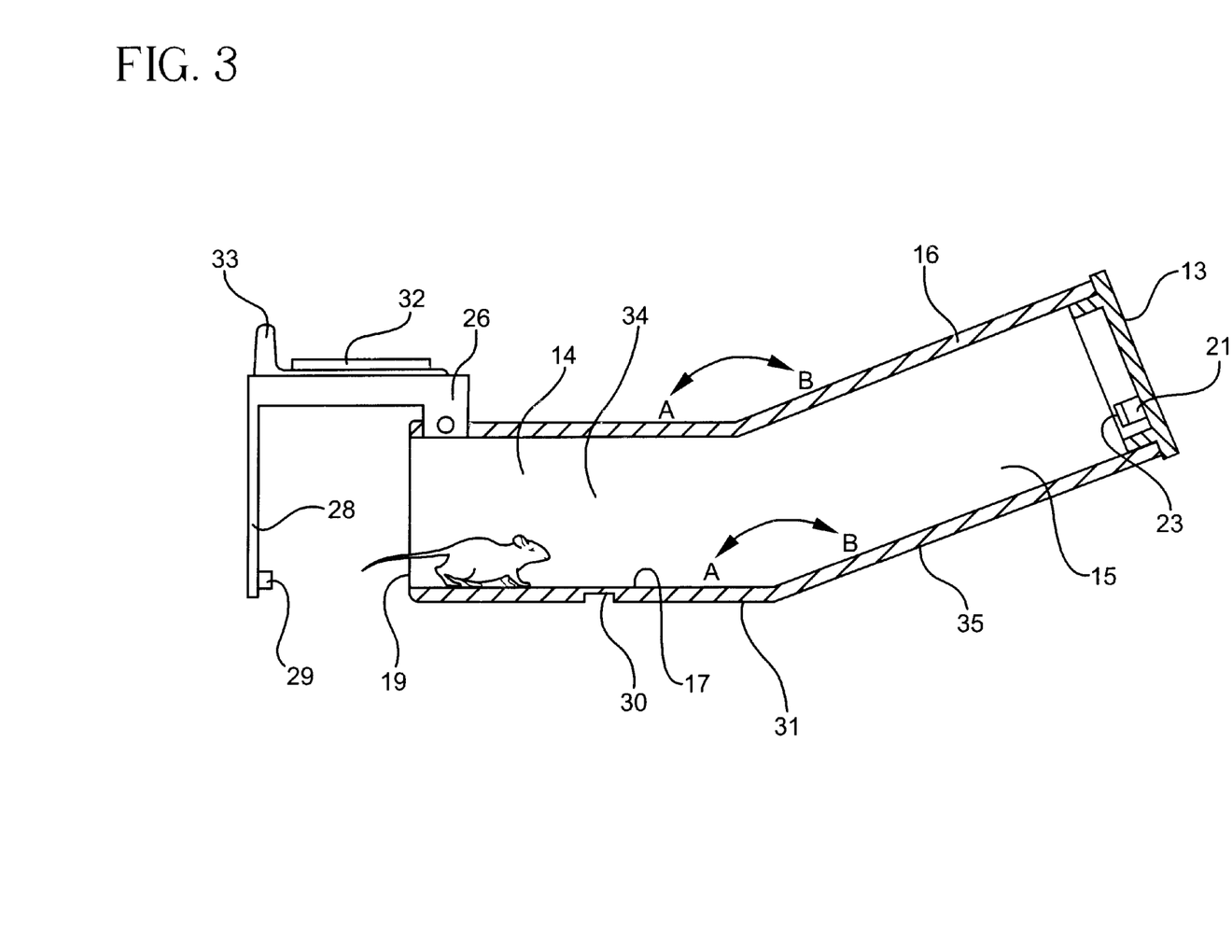
FIG. 3 is a side cutaway view of the trap of the instant invention with the door open and animal entering.
Figure 5:
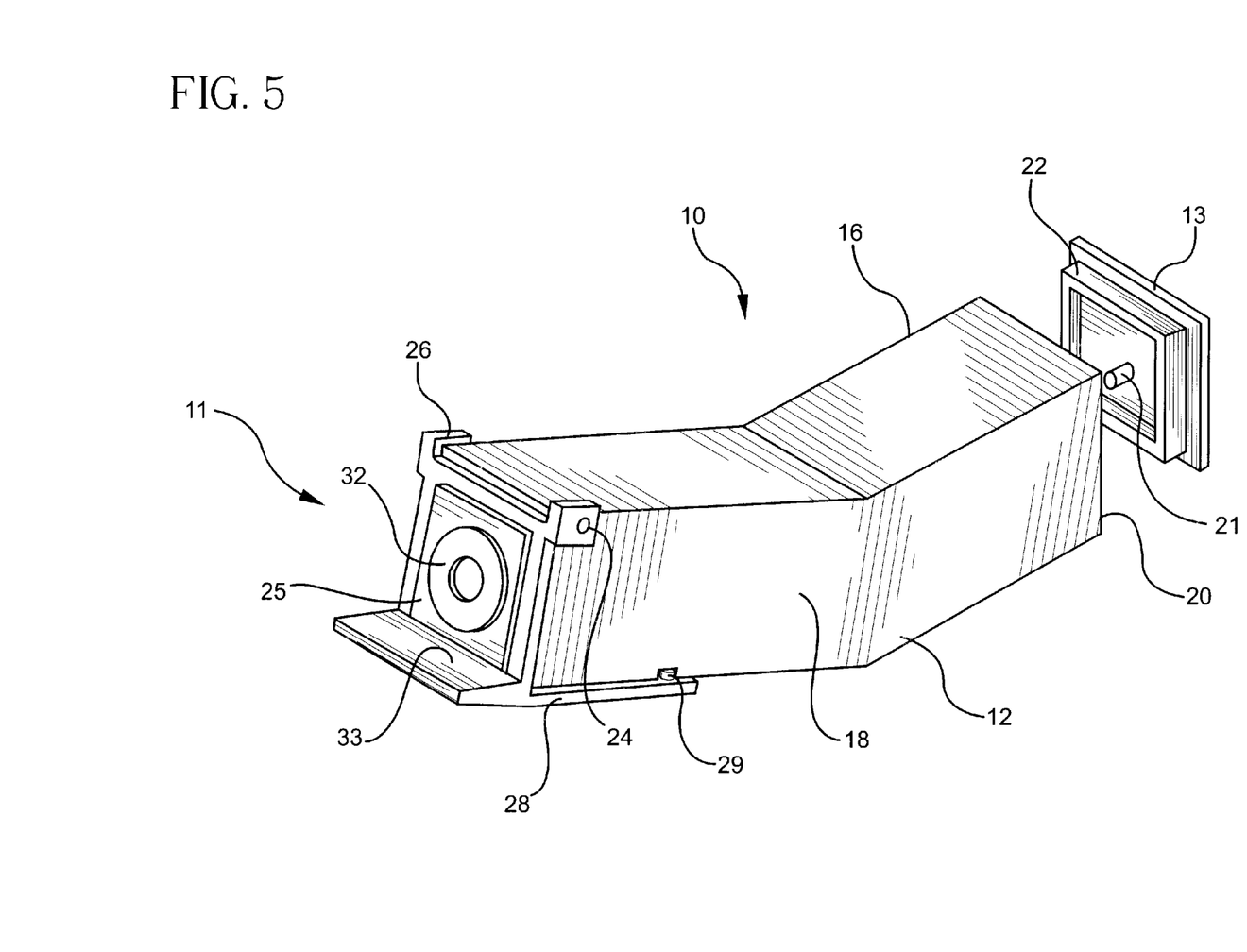
FIG. 5 is a front perspective view of the trap of the instant invention with the door closed and locked and showing the back panel removed.

The small animal trap 10 of the instant invention may have three essential parts, a pivotal door assembly 11, a chamber 12, and a removable back panel 13, as seen in FIGS. 1, 2 and 5. The chamber 12 may be of tubular construction that may be substantially square in cross section and may be composed of two contiguous and equal segments, a forward segment 14 and a rearward segment 15. There may be an upper surface 16, a lower surface or floor 17 and two side walls 18. The upper surface 16 and floor 17 may be parallel and the upper surfaces and lower surfaces of the forward segment 14 and rearward segment 15 may form an obtuse angle A-B as seen in FIG. 3.

Figure 7:
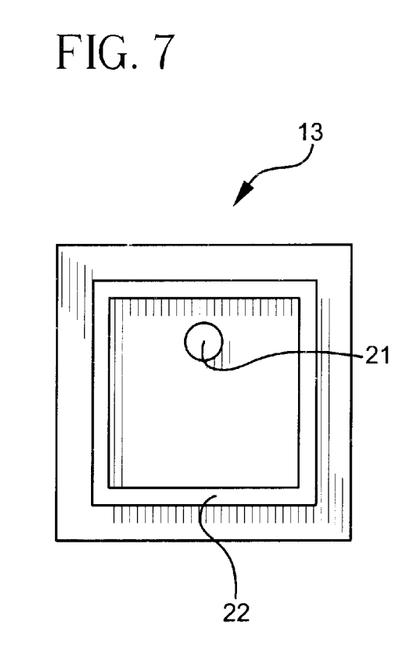
FIG. 7 is a front plan view of the inside of the back panel with the bait receiving element in the upper position.
Figure 8:
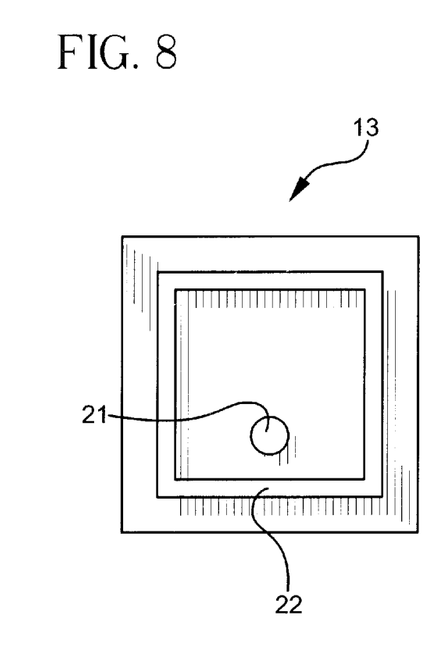
FIG. 8 is a front plan view of the inside of the back panel with the bait receiving element in the lower position.

The tubular chamber 12 may be open at the forward end 19 and at the rearward end 20. The rearward end 20 may be closed by means of the removable back panel 13 which may have a sealing frame 22 disposed within the perimeter of the interior surface and dimensioned to form a tight seal with the rearward end 20 of the chamber 12. There may be a bait receiving element 21 projecting from the interior surface of the back panel 13 at a point nearer to one edge. The offset positioning of the bait receiving element 21 may enable the bait 23 to be placed near the floor 17 of the chamber 12 or near the upper surface 16 of the chamber 12 or closer to one of the side walls 18. See FIGS. 5, 7 and 8. The choice of placement may be dictated by the type of animal targeted or the size and type of bait used.

The front end 19 of the chamber may be closed by the door assembly 11 which may be pivotally attached to the exterior surfaces of the side walls 18 by means of pivot pins 24 situated on the upper front corners of the side walls 18 adjacent to the front end 19. The pivot pins 24 may be formed integrally with the side walls 18 in the manufacturing process.

Figure 9:
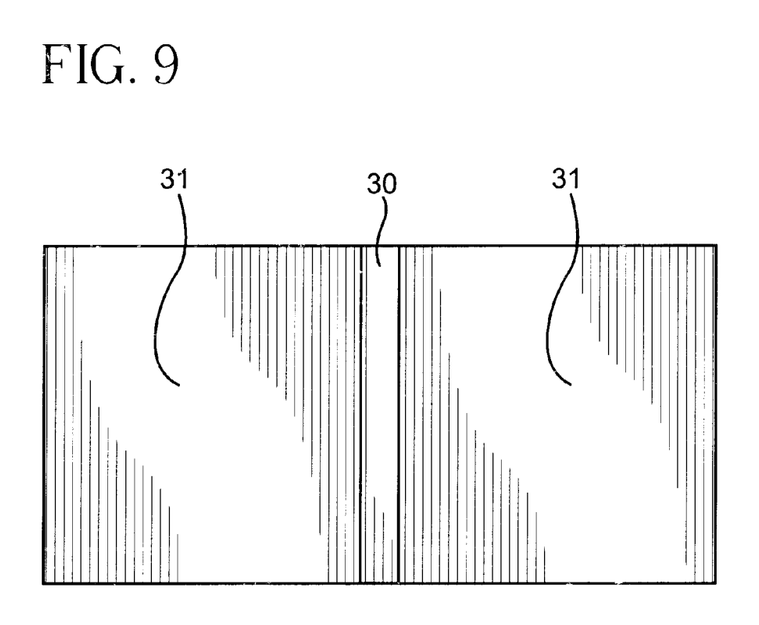
FIG. 9 is a bottom plan view of the front segment of the trap showing the locking channel.

The door assembly 11 may have a closure panel 25 with two ears 26 projecting rearward at right angles from the upper edge of the panel 25. The ears 26 may each have an aperture 27 which cooperates with a pivot pin 24 enabling the door assembly 11 to pivot into a closed position when the trap 10 is activated. There may be two legs 28 that are contiguous with the closure panel 25 and extend rearwardly at right angles from its the lower edge. The legs 28 and the closure panel 25 may be substantially the same length and may also be of the same dimension as the height of the chamber 12. A foot or locking member 29 may project inwardly at a right angle from the end each leg 28. There may be a transverse locking channel 30 across the middle of the bottom surface 31 of the forward segment 14 of the chamber 12. (FIG. 9) The locking channel 30 may be dimensioned to securely accept and hold the two locking members 29 when the trap 10 is activated and the closure panel 25 is pivoted downward.

It is important that, upon activation, the door assembly 11 closes quickly and securely by pivoting into the closed position. To insure that the door assembly 11 may pivot to the final downward orientation such that the locking members 29 coact with the locking channel 30 in a quick and secure manner, the door assembly 11 may be provided with extra weight. The extra weight may be distributed in two places. One may be a thickened raised area situated at and integral with the center of the front face of the closure panel 25. In the preferred embodiment, this may be in the form of a raised circle or band 32. The second weighted area may be in the form of a lip 33 projecting forwardly at a right angle from the bottom edge of the closure panel 25. Both the lip 33 and the band 32 may be formed as part of the one piece door assembly 11 during manufacture by injection molding or other such method. This added weight may assure a speedy and secure closure of the door assembly 11 without the necessity of any additional security measures. The extended lip 33 may also assist in balancing the door assembly 11 and may add leverage to prevent the door assembly 11 from becoming dislodged and opened once it is locked in place.

Figure 4:
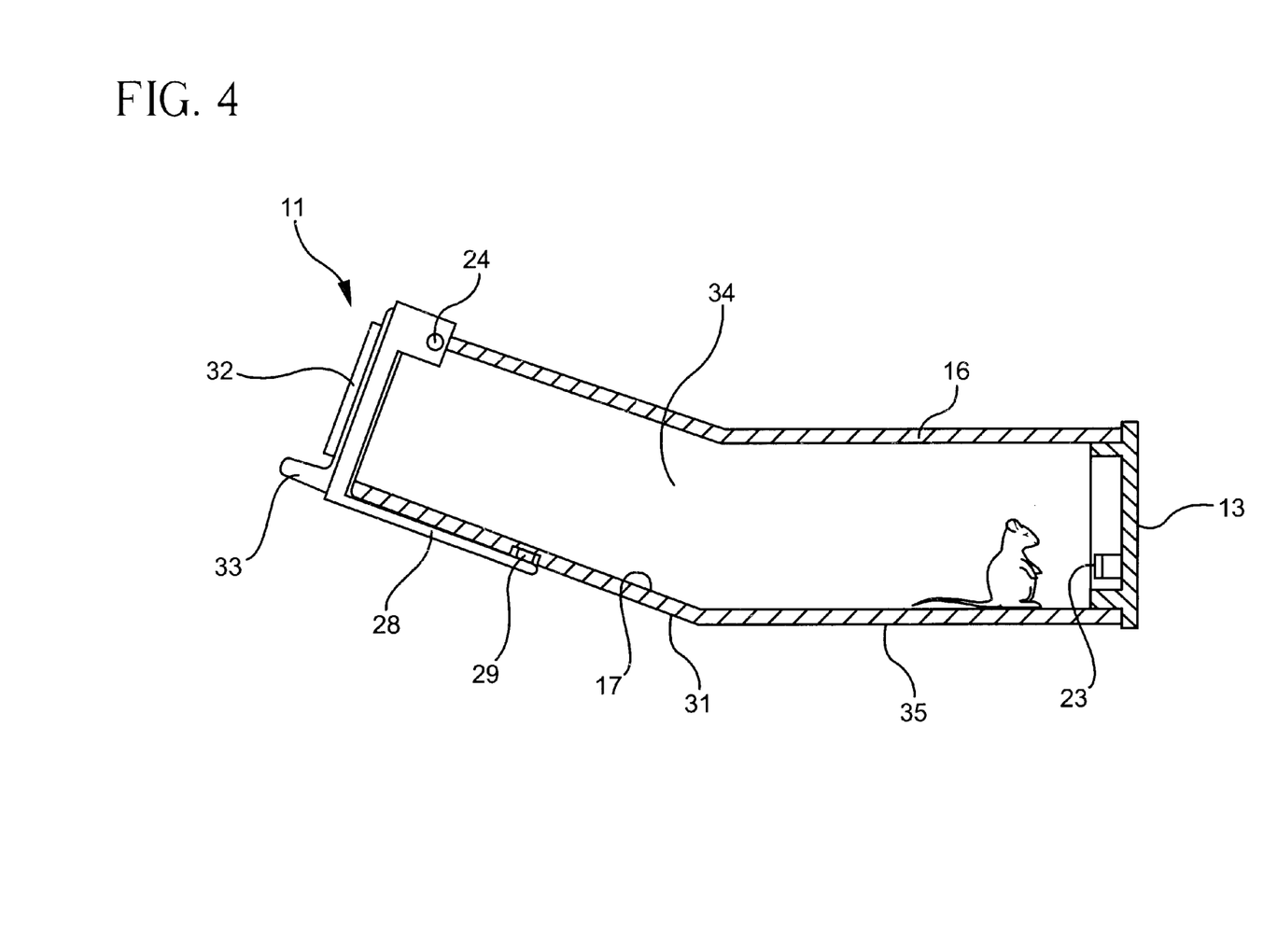
FIG. 4 is a side cutaway view of the trap of the instant invention with an animal inside and the door closed and locked.
Figure 6:
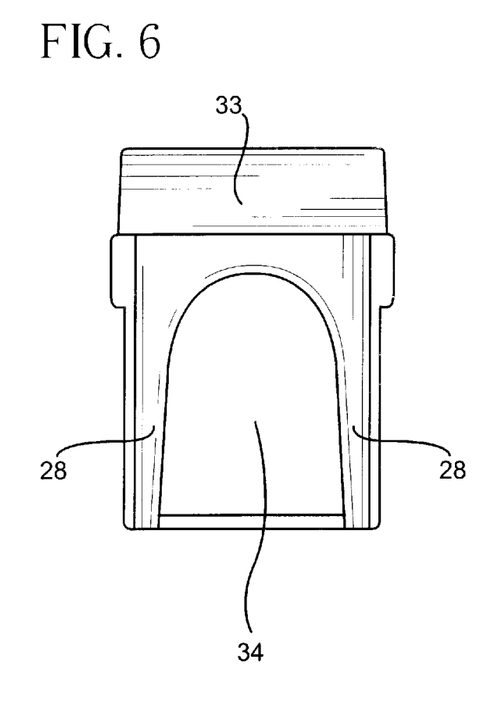
FIG. 6 is a front plan view of the trap of FIG. 1.

In operation, the back panel 13 may be removed and bait 23 may be placed on the bait receiving element 21. The back panel 13 may thereafter be replaced with the bait receiving element 21 set at the desired level. The small animal trap 10 may be placed on a reasonably flat supporting surface and set so that the undersurface 31 of the forward segment 14 may be in contact with the supporting surface and the rearward segment 15 may be elevated. The door assembly 11 may be pivoted into the opened orientation and the closure panel 25 may be supported on the legs 28 such that the open front end 19 is clearly exposed providing substantially unobstructed accessibility to the open front end 19 and the interior 34 of the chamber 12 as seen in FIGS. 1, 3 and 6. The odor of the bait 23 may attract a small animal which may enter the chamber 12 through the open front end 19 and move toward the bait 23 affixed to the bait receiving element 21 on the back panel 13. As the animal passes into the rearward segment 15 the center of gravity may be caused to shift and the chamber 12 to rock or tilt rearward so that the undersurface 35 of the rearward segment 15 makes contact with the supporting surface and the forward segment 14 becomes elevated. (FIG. 4) As the forward segment 14 moves upward, the door assembly 11 may be caused to pivot downward, assisted by the weighted closure panel 25 and lip 33, causing the locking elements 29 to become inserted into the locking channel 30 thereby securing the door assembly 11 in locked orientation. Once locked, the small animal cannot dislodge the door assembly by thrashing or running back and forth. Even if the movements of the animal cause the center of gravity to shift so that the forward segment 14 moves downward, the balancing effect of the lip 33 may prevent the locking members 29 from becoming dislodged once they have engaged the locking channel 30. (See FIGS. 2 and 4)

The door assembly 11 may be quite stable when in the set position and cannot be tripped unless an animal is inside the chamber 12 and causes the center of gravity to shift to the rearward segment 15. Once locked, the door assembly 11 cannot become dislodged even if the animal moves back and forth within the chamber 12 as noted above. Therefore, the tripping of the door assembly 11 indicates to an observer that there is an animal inside the trap 10. The entire trap 10 with the animal inside may then be disposed of, or the animal may be removed and the trap 10 may be reset. The design of the door assembly 11 provides for a stable set-up even if the undersurface where the trap 10 is placed is not completely flat or horizontal.

Figure 10:
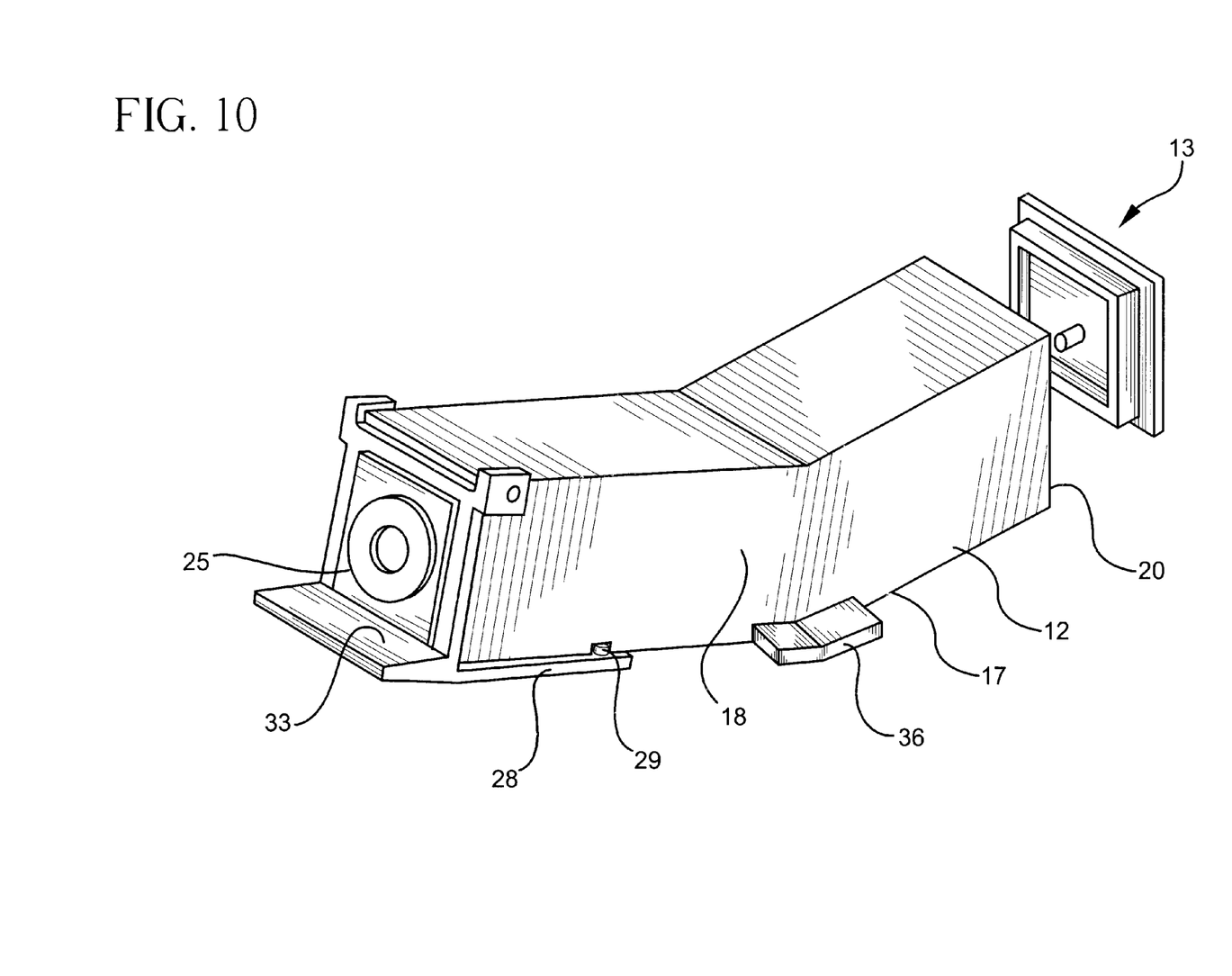
FIG. 10 is a front perspective view of the trap of the instant invention showing a side stabilizer.
Figure 11:
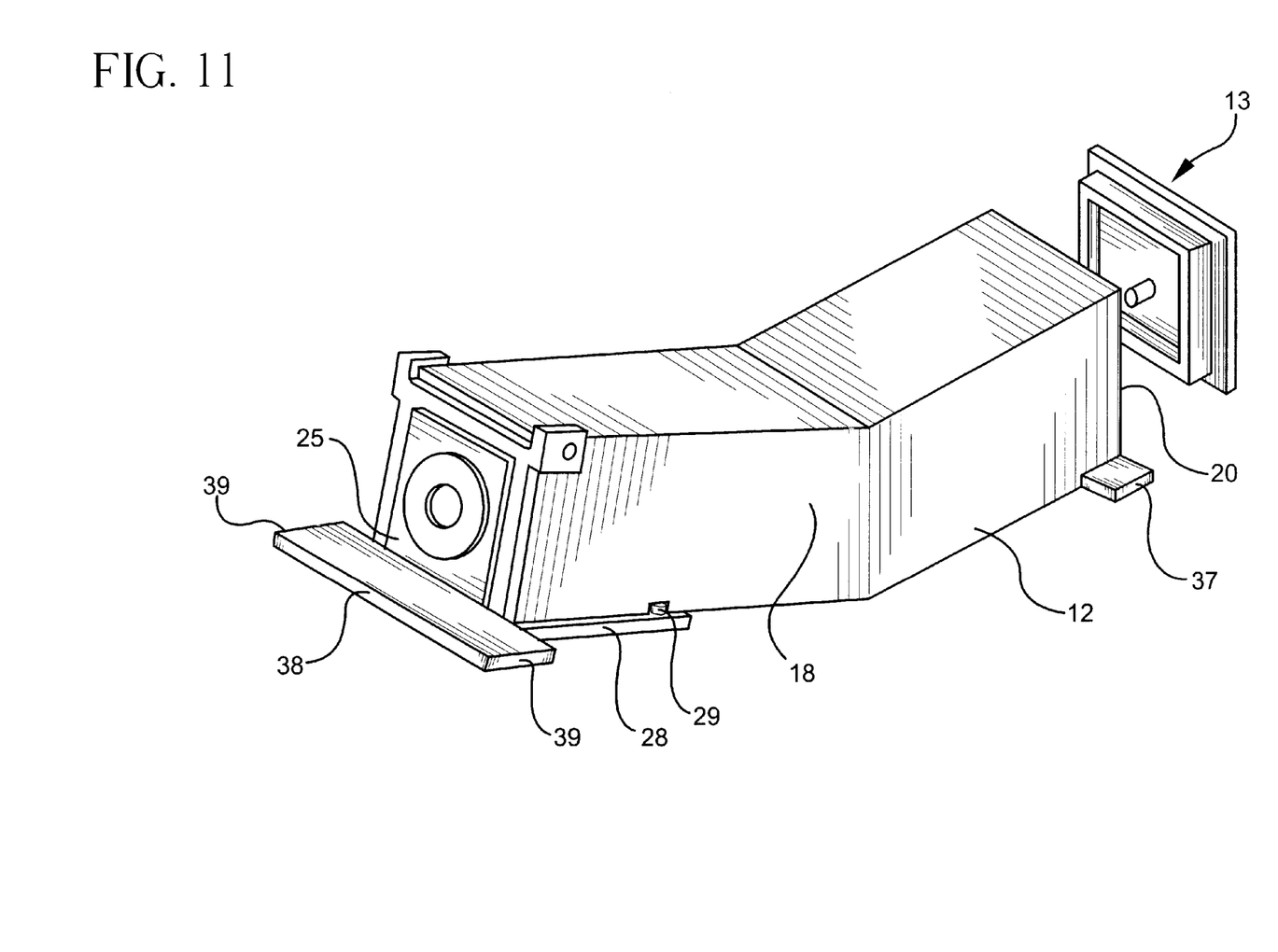
FIG. 11 is a front perspective view of the trap of the instant invention showing a rear stabilizer and the front lip stabilizers.

Once trapped in such a chamber, some animals may thrash and run about more than others. Violent thrashing by a trapped animal may cause the small animal trap 10 to topple sideways. To prevent this possibility, one or more sets of side extension stabilizers may be added to the device. Such stabilizers may be formed integrally with the side walls 18 of the chamber 12, or with the forwardly projecting lip 33 that is a part of the door assembly 11. One type of side stabilizers may be in the form of mid-wings 36 extending outwardly from the bottom of the midpoint of the exterior of each side wall 18. The mid-wings 36 may follow the contour of the lower surface 17 of the chamber 12. (FIG. 10) Side stabilizers may be also be in the form of rear-wings 37 placed adjacent to each side of the rearward end 20 of the chamber 12, also extending from the bottoms of the side walls 18. A third stabilizer may be in the form of projections 39 extending from each side of a winged lip 38 projecting outwardly from the bottom edge of the closure panel 25. (FIG. 11) One, two, or all three sets of stabilizers may be incorporated into the design of the instant invention. The stabilizers may typically extend only 0.3 in (8 mm) from the side walls to be effective.

The small animal trap 10 of the instant invention may be made of any rigid polymeric material or other rigid material. It may be manufactured by injection molding or any method that will produce the necessary parts. The preferred embodiment, as illustrated, may be made in three pieces, door assembly 11, chamber 12 and back panel 13. The main chamber 12 may also be made from two pieces of a standard tubular material cut at the proper angle and joined together by an appropriate adhesive or heat welding process. The stabilizers may be formed integrally with the main chamber 12 and door assembly 11. The stabilizers that project from the side walls of the chamber may also be added later by any method known in the art.

While one embodiment of the present invention has been illustrated and described in detail, it is to be understood that this invention is not limited thereto and may be otherwise practiced within the scope of the following claims.

What is claimed is:

1. A small animal trap that is capable of capturing the animal alive and without injury, said trap comprising:
   a tubular chamber having a front opening and a rear opening and being composed of two contiguous segments, a first forward segment and a second rearward segment, each of said segments being defined by an upper surface, a lower surface, and two side walls, and said segments being joined such that the lower surfaces of the two segments form an obtuse angle;
   two pivot pins, each situated on an upper exterior surface of one of the side walls adjacent to the front opening;
   a rear closure panel having an interior surface and an exterior surface and being dimensioned to reversibly and securely close the rear opening;
   a bait receiving element integral with the interior surface of the rear closure panel and situated at point off center on said interior surface so as to permit different positioning of bait;
   a transverse locking channel situated on an exterior lower surface of the first segment; and
   a front door assembly comprising:
      a front closure panel having an upper edge and a lower edge and being dimensioned to securely close the front opening;
      two ears situated on opposing upper corners of said front closure panel, integral therewith, and projecting rearward at right angles therefrom, each of said ears having an aperture dimensioned to pivotally receive the pivot pins and enabling the front closure panel to be pivoted upward to a horizontal orientation when the trap is set and downward to close the front opening when the trap is activated;
      two support legs integral with said front closure panel and projecting downward at right angles from opposing corners of the lower edge thereof such that the support legs maintain the front closure panel in the open horizontal orientation while providing substantially unobstructed accessibility to the front opening when the trap is set;
      a locking member situated at the bottom of each support leg and projecting rearward at right angles therefrom for cooperation with the locking channel when the trap is activated;
   whereby when the trap is set the forward segment is in a substantially horizontal orientation, the front closure panel is in the horizontal orientation, and bait is placed on the bait receiving element to entice an animal to enter the trap through the front opening and move rearward activating the trap, at which time the chamber tilts rearward and the rearward segment is in a substantially horizontal orientation, the front closure panel pivots downward to close the front opening, the legs come to rest under the forward segment, and the locking members engage the locking channel securely entrapping the animal.

2. A small animal trap as in claim 1 further comprising a raised thickened portion integral with the front closure panel to provide additional weight thereto.

3. A small animal trap as in claim 1 further comprising a lip integral with said front closure panel, situated at the bottom edge thereof, and extending forward therefrom, said lip to provide additional weight to the front closure panel and leverage to insure continued closure after the trap is activated.

4. A small animal trap as in claim 1 further comprising stabilizing wings extending from the mid-point of the lower exterior edge of each of the side walls.

5. A small animal trap as in claim 1 further comprising stabilizing wings extending from the lower exterior rear edge of each of the side walls.

6. A small animal trap as in claim 3 further comprising stabilizing projections extending from each side of the lip.

7. An improved small animal trap of a type having a tubular chamber with two integral floor segments, a forward segment and a rearward segment, forming an obtuse angles and an open front end, said improvements comprising:
   an open back end with a removable back closure panel having an interior surface and an exterior surface and being dimensioned to securely close the open back end and enable easy placement of bait inside the chamber;
   a bait receiving element integral with the interior surface of the back closure panel and situated at a point off center on said interior surface so as to permit different positioning of bait;
   two pivot pins, each situated on an upper exterior surface of each side of the forward segment of the chamber adjacent the open front end;
   a transverse locking channel situated on an exterior undersurface of the forward segment of the chamber; and
   a front door assembly comprising:
      a front closure panel having an upper edge and a lower edge and being dimensioned to securely close the front opening;
      two ears situated on opposing upper corners of said front closure panel, integral therewith, and projecting rearward at right angles therefrom, each of said ears having an aperture dimensioned to pivotally receive the pivot pins and enable the front closure panel to be pivoted upward to a horizontal orientation when the trap is set and downward to close the front opening when the trap is activated;

two support legs integral with said front closure panel and projecting downward at right angles from opposing corners of the lower edge thereof such that said support legs maintain the front closure panel in the open horizontal orientation while providing substantially unobstructed accessibility to the front opening when the trap is set; and a locking member situated at the bottom of each support leg and projecting rearward at right angles therefrom for cooperation with the locking channel when the trap is activated.

8. A small animal trap as in claim 7 further comprising a raised thickened portion, integral with and centrally located on the front closure panel to provide additional weight thereto.

9. A small animal trap as in claim 7 further comprising a lip integral with said front closure panel, situated at the bottom edge thereof, and extending forward therefrom, said lip to provide additional weight to the front closure panel and leverage to insure continued closure after the trap is activated.

10. A small animal trap as in claim 7 further comprising stabilizing wings extending from the mid-point of the lower exterior edge of each side of the chamber.

11. A small animal trap as in claim 7 further comprising stabilizing wings extending from the lower exterior rear edge of each side of the chamber.

12. A small animal trap as in claim 9 further comprising stabilizing projections extending from each side of the lip.

13. A pivotal door assembly for use with a small animal trap of a type having a chamber with two floor segments, a forward segment and a rearward segment forming an obtuse angle, an open front end, a closed back end, a locking channel on the underside of the forward segment, and two pivot pins, each situated on an upper exterior surface of the chamber adjacent the open front end, said door assembly comprising:

a front closure panel having an upper edge and a lower edge and being dimensioned to securely close the front opening;

two ears situated on opposing upper corners of said front closure panel, integral therewith, and projecting rearward at right angles therefrom, each of said ears having an aperture dimensioned to pivotally receive the pivot pins and to enable the front closure panel to be pivoted upward to a horizontal orientation when the trap is set and to swing downward to a closed orientation when the trap is activated;

two support legs integral with said front closure panel and projecting downward at right angles from opposing corners of the lower edge thereof such that said support legs maintain the front closure panel in the open horizontal orientation while providing substantially unobstructed accessibility to the front opening when the trap is set; and a locking member situated at the bottom of each support leg and projecting rearward at right angles therefrom for cooperation with the locking channel when the trap is activated.

14. A door assembly as in claim 13 further comprising a raised thickened portion integral with and centrally located on the front closure panel to provide additional weight thereto.

15. A door assembly as in claim 13 further comprising a lip integral with said front closure panel, situated at the bottom edge thereof, and extending forward therefrom, said lip to provide additional weight to the front closure panel and leverage to insure continued closure after the animal trap is activated.

16. A door assembly as in claim 15 further comprising stabilizing projections extending from each side of the lip.

* * * * *